United States Patent [19] [11] 4,336,177
Backhouse et al. [45] Jun. 22, 1982

[54] POLYMERIZATION PROCESS

[75] Inventors: Alan J. Backhouse, South Ascot; Charles Bromley, Bourne End; Morice W. Thompson, Maidenhead, all of England

[73] Assignee: Imperial Chemical Industries Limited, London, England

[21] Appl. No.: 212,753

[22] Filed: Dec. 4, 1980

[30] Foreign Application Priority Data

Dec. 6, 1979 [GB] United Kingdom ................. 7942092

[51] Int. Cl.$^3$ ................................................ C08K 5/01
[52] U.S. Cl. .................................... 523/201; 525/902; 524/529; 524/533; 524/458; 524/833
[58] Field of Search ................. 260/29.6 R, 29.6 RW, 260/29.7 D, 29.7 DP, 29.7 UA, 29.7 UP, 29.7 W, 34.2; 525/902

[56] References Cited

U.S. PATENT DOCUMENTS

| | | | |
|---|---|---|---|
| 3,317,635 | 5/1967 | Osmond | 260/29.6 RB |
| 3,514,500 | 5/1970 | Osmond | 260/29.6 RW |
| 3,574,161 | 4/1971 | Campion | 260/34.2 |
| 3,929,693 | 12/1975 | Hochberg | 260/17 R |
| 4,025,474 | 5/1977 | Porter | 260/22 CQ |
| 4,102,846 | 7/1978 | Bentley | 260/34.2 |
| 4,115,472 | 9/1978 | Porter | 260/33.6 UB |
| 4,209,435 | 6/1980 | Backhouse | 260/34.2 |
| 4,229,339 | 10/1980 | Bentley | 260/34.2 |

FOREIGN PATENT DOCUMENTS 2039497 8/1980 United Kingdom .

*Primary Examiner*—Paul R. Michl
*Attorney, Agent, or Firm*—Cushman, Darby & Cushman

[57] ABSTRACT

A process is described for making sterically stabilized non-aqueous dispersions of composite polymer microparticles, in which (1) monomers including at least one crosslinking monomer are polymerized in an aqueous medium at a temperature at least 10° higher than the glass transition temperature of the polymer to be formed, in the presence of a block or graft copolymer stabilizing agent, under conditions such that there is at no time present a separate monomer phase, (2) further monomers, not including any crosslinking monomer, are polymerized in the dispersion thus obtained, the presence of a separate monomer phase again being avoided, and (3) the microparticles are transferred from the resulting dispersion into a non-aqueous medium which is a solvent for the non-crosslinked polymer generated in (2). The microparticles are of value for incorporation into coating compositions the main film-forming constituent of which is compatible with the non-crosslinked component of the particles.

10 Claims, No Drawings

POLYMERIZATION PROCESS

This invention relates to the production of cross-linked polymer microparticles suitable for incorporation in coating compositions in order to modify the rheological properties of the compositions and/or the physical properties of the coatings obtained therefrom.

There have previously been described a variety of coating compositions which incorporate polymer microparticles that are insoluble in, but stably dispersed in, the binder. Reference may be made to British Patent Application Nos. 17122/77, 17123/77, 17124/77, 17125/77, 30236/77, 33500/77, 871/78, 20096/78 (German OLS No. 2818093, 2818094, 2818095, 2818100 and 2818102, European Applications Nos. 78300095 and 78300419), as well as to British Patent Specifications Nos. 1,242,054, 1,451,948 and 1,538,151, and U.S. Pat. Nos. 3,929,693, 4,025,474 and 4,115,472. In general, the microparticles are incorporated in the coating compositions for either or both of two reasons:

(i) in order to modify the rheological characteristics of the composition, which influence its behaviour on application to a substrate;

(ii) in order to modify the mechanical or physical properties of the coating film which is obtained after application of the composition to the substrate.

Microparticles which have been described in the foregoing patent literature are of both simple and composite types. The simple type of microparticle is an essentially spherical particle of colloidal dimensions which is homogeneous with respect to the polymer of which it is composed; its required insolubility in the binder component of the coating composition is achieved either by choosing as the polymer in question one which is inherently insoluble in the binder, or by introducing a sufficient degree of crosslinking into a polymer which otherwise would be soluble in the binder. The composite type of microparticle has a spherical core which is of a similar nature to the simple type of particle, but the core is associated with an outer layer of a second polymer which is not crosslinked; this second polymer is frequently chosen so as to be compatible with the main film-forming resin of the coating composition into which the microparticles are to be incorporated.

Methods for preparing the microparticles, by polymerization of appropriate monomers, are also of various types. Of particular interest are those procedures in which the resulting polymer is obtained directly in particulate form as a dispersion in a liquid which is a non-solvent for the polymer. The particles so obtained can be separated from the dispersion liquid and then incorporated in the coating composition, or, in suitable cases, the dispersion itself can be blended with the other constituents of the coating composition. Two procedures are commonly used for making such dispersions:
(i) the non-aqueous dispersion polymerisation technique, in which the monomer is polymerised in an inert organic liquid which dissolves the monomer but not the resulting polymer, in the presence, dissolved in the liquid, of a polymerisation initiator and of a polymeric stabiliser whereby the resulting disperse particles are sterically stabilised against gross flocculation; (ii) the aqueous emulsion polymerisation technique, in which the monomer is polymerised as an emulsion in water, in the presence of a water-soluble polymerisation initiator and of a water-soluble surface-active agent, the polymer particles in this case being stabilised against gross flocculation largely as a result of their carrying electrical charges.

The available methods do, however, suffer from certain limitations in respect of the kind of microparticle which can be successfully made by them. In the case where the microparticles are required for the modification of the mechanical properties of a coating, in particular where it is desired to reduce the brittleness of a film without resorting to the use of an external plasticiser, the microparticles should be rubbery at ambient temperatures. This in turn requires that the polymer of which the microparticles are composed should be derived predominantly from so-called "soft" monomers such as ethyl acrylate, propyl acrylate, 2-ethylhexyl acrylate, butyl methacrylate, 2-ethoxyethyl methacrylate, vinyl acetate or vinyl propionate. Such monomers do not, however, readily lend themselves to polymerisation by non-aqueous dispersion techniques because of the difficulty of finding an inert liquid in which they are soluble but the derived polymer is insoluble; homopolymers or copolymers of these monomers tend to be appreciably soluble in the aliphatic hydrocarbon liquids which are the favoured media for dispersion polymerisation of monomers such as methyl methacrylate, and in consequence it is very difficult to obtain them in stable, disperse form. Furthermore, where it is desired that the microparticle polymer should be cross-linked, non-aqueous dispersion techniques have the further limitation that, unless special precautions are taken, cross-linking must be effected after the main polymerisation of the monomer is complete, otherwise the utilisation of the stabiliser is inefficient and there is a risk of the particles flocculating during the polymerisation. In practice, this rules out the introduction of cross-linking by the use of comonomers which are polyfunctional with respect to the polymerisation reaction, e.g. ethylene glycol dimethacrylate, and it is necessary instead to employ comonomers containing mutually reactive groups through which covalent linkages can be generated, preferably in a separate, subsequent operation.

These difficulties can be avoided by polymerising such monomers, including polyfunctional monomers if desired, by the aqueous emulsion technique, but a different problem then arises, namely the presence in the dispersion of ionic species derived from the initiator and/or the surfactant used. In order to render the particles thus obtained suitable for incorporation in coating compositions, more especially compositions based on non-aqueous diluents, it is necessary to free the particles as far as possible from these ionic species, usually by first precipitating the particles from the aqueous dispersion, then washing them with water and finally drying them. It is clearly a disadvantage to have to carry out these three intermediate operations, and in any event the removal of ionic species thereby is usually incomplete.

We have now found that stable dispersions of composite cross-linked polymer microparticles in non-aqueous media can be produced, without encountering any of the difficulties or limitations discussed above, by a process wherein the mircoparticles are formed by dispersion polymerisation of monomers in an aqueous medium, avoiding the presence of ionic species, and are subsequently transferred to a non-aqueous medium.

According to the present invention there is provided a process for the production of a stable dispersion in a non-aqueous liquid medium of composite polymer microparticles having a diameter of from 0.1 to 10 microns, each of which comprises a core of crosslinked polymer surrounded by and grafted to a layer of non-crosslinked polymer, the process comprising the steps of (1) polymerising one or more ethylenically unsaturated monomers, including at least one crosslinking monomer, from which the crosslinked core polymer of the microparticles is to be derived, in an aqueous medium as hereinafter defined at a temperature at least 10° C. higher than the glass transition temperature of the core polymer in the presence in the aqueous medium as steric stabiliser of a block or graft copolymer which contains in the molecule a polymeric component which is solvatable by the aqueous medium and another polymeric component which is not solvatable by the aqueous medium and is capable of becoming associated with the polymer particles formed, the concentration of free monomer in the polymerisation mixture being maintained throughout this process step at a level such that at no time does the free monomer form a separate phase and the total amount of monomer polymerised being such that the resulting dispersion contains at least 20% by weight of microparticles, (2) polymerising, in the dispersion obtained from step (1), one or more further ethylenically unsaturated monomers, not including any crosslinking monomer, from which the non-crosslinked polymer of the outer layer is to be derived, optionally in the presence of additional block or graft copolymer stabiliser, the concentration of such further monomer in the free state in the polymerisation mixture being maintained at a level such that at no time does that free monomer form a separate phase, and (3) transferring the polymer microparticles from the resulting dispersion into a non-aqueous liquid medium which is a solvent for the non-crosslinkable polymer under such conditions that the particles become stably dispersed therein.

By "aqueous medium" we mean herein a mixture comprising (a) at least 30% by weight of water and (b) not more than 70% by weight of a second constituent which is miscible with water, the nature and proportion of which are such that the mixture as a whole is capable of dissolving the monomer or monomers being polymerised to the extent of at least 3% by weight but is a non-solvent for the polymer formed. The second constituent may be a single substance or it may be a water-miscible mixture of two or more substances.

Preferably the aqueous medium is capable of dissolving the monomer or monomers to the extent of at least 10% by weight.

By "glass transition temperature" (Tg) we mean the temperature at which the polymer which is produced in the process of the invention passes from the glassy state to the rubbery state, or vice versa. The Tg value in question will normally be that of the bulk polymer as 100% material, but in a case where, as subsequently described, a plasticising substance is deliberately added to the polymerisation mixture for the purpose of reducing the effective Tg of the polymer, the Tg value for the purposes of the invention is that of the plasticised polymer. Even where a plasticiser for the polymer is not added as such, the "environmental" Tg of the polymer under the conditions obtaining during polymerisation may be somewhat lower than the bulk Tg value referred to above, owing to some plasticisation of the polymer by residual monomer or other constituents of the polymerisation mixture. Thus it may be possible in practice to operate with a somewhat lower minimum polymerisation temperature than that indicated by the bulk Tg value. However, the effect of such fortuitous plasticisation on the Tg value is difficult to predict and, whilst it can in principle be determined by simple trial and error, it is more convenient under these conditions to choose the temperature of polymerisation by reference to the bulk Tg value. The Tg of a bulk polymer, or of a deliberately plasticised polymer, may be determined for the present purposes, by experimental methods which are well known to those skilled in the art, upon polymer of the same composition as that which is to be formed in the process of the invention but obtained by some other route, for example by polymerisation of the monomers in bulk or in solution, with subsequent addition of plasticiser where appropriate. Alternatively, Tg values can be calculated, from a knowledge of the monomer composition of the polymer, by known methods.

By way of illustration, the following bulk Tg values may be quoted (ratios stated are by weight): for a 50:50 methyl methacrylate/butyl acrylate copolymer, 4° C.; for a 80:20 methyl methacrylate/2-ethylhexyl acrylate copolymer, 41° C.; for a homopolymer of ethyl acrylate, −22° C.; for a homopolymer of methyl methacrylate plasticised in the ratio 60:40 with a neopentyl glycol/butyl alcohol adipate polyester plasticiser, 55° C. Any of these polymer compositions can be successfully prepared in the form of an aqueous latex by the processs of the invention at the polymerisation temperatures in the range 70°–90° C. which are normally employed for the polymerisation of acrylic monomers in the presence of an azo initiator.

Ethylenically unsaturated monomers which may be used in step (1) of the process of the invention include in particular the acrylic monomers, that is to say acrylic acid or methacrylic acid and their alkyl esters such as methyl methacrylate, ethyl methacrylate, butyl methacrylate, ethyl acrylate, butyl acrylate, hexyl acrylate, n-octyl acrylate, lauryl methacrylate, 2-ethylhexyl acrylate, nonyl acrylate, lauryl acrylate, benzyl methacrylate and cetostearyl acrylate, the hydroxyalkyl esters of the same acids such as 2-hydroxyethyl acrylate, 2-hydroxyethyl methacrylate and 2-hydroxypropyl methacrylate, and the nitriles and amides of the same acids such as acrylonitrile, methacrylonitrile, acrylamide and methacrylamide. Other monomers which may be used, either alone or in admixture with these acrylic monomers, include vinyl aromatic compounds such as styrene, tert-butyl styrene and vinyl toluene, vinyl esters of organic and inorganic acids such as vinyl acetate, vinyl propionate and vinyl chloride. Yet other comonomers which may be used in conjunction with any of the foregoing monomers include dialkyl maleates, dialkyl itaconates, dialkyl methylene-malonates, isoprene and butadiene.

Preferred crosslinking monomers which may be used, in order to effect crosslinking of the core polymer of the microparticles, are monomers which are polyfunctional with respect to the polymerisation reaction, including the esters of unsaturated monohydric alcohols with unsaturated monocarboxylic acids, such as allyl acrylate, allyl methacrylate, butenyl acrylate, butenyl methacrylate, undecenyl acrylate, undecenyl methacrylate, vinyl acrylate and vinyl methacrylate, dienes such as butadiene and isoprene, esters of saturated monohydric alcohols with polyunsaturated carboxylic acids such as ethyl sorbate and diethyl muconate, the diesters of saturated glycols or diols with unsaturated monocarboxylic acids, such as ethylene glycol diacrylate, ethylene glycol dimethacrylate, polyfunctional aromatic compounds such as divinylbenzene, and other doubly unsaturated compounds such as the methacrylic acid ester of ethylene glycol monodicyclopentenyl ether.

Alternatively, crosslinking may be achieved by including, in the monomers being polymerised, pairs of crosslinking monomers, each member of the pair carrying a functional group which can enter, under the conditions of polymerisation, into a condensation-type reaction with a complementary functional group carried by the other member of the pair. Examples of suitable pairs of monomers include glycidyl (meth)acrylate+(-meth)acrylic acid and glycidyl (meth)acrylate+(meth)acrylic anhydride.

The proportion of crosslinking monomer or monomers may vary according to the degree of crosslinking which it is desired that the core polymer should exhibit, but in general a proportion of 0.2-10%, preferably 0.5-1%, based on the total core monomer weight, is suitable.

According to the monomer or monomers from which the polymer forming the core of the composite microparticles is derived, that polymer may be either rubbery or glassy at room temperature, that is to say, it may have a Tg which lies either below or above room temperature, respectively. The choice of Tg depends to some extent upon the purpose for which the composite microparticles are to be incorporated in a coating composition; in particular, where it is desired to modify the mechanical or physical properties of the ultimate coating film, the core polymer is preferably rubbery at room temperature, and more preferably has a Tg below −20° C. An upper limit to the Tg of the core polymer may be set by the practicality of carrying out the polymerisation at a temperature at least 10° C. higher than the Tg of that polymer.

Preferably, the temperature of polymerisation of the monomer or monomers is at least 20° C., more preferably at least 30° C., higher than the glass transition temperature of the polymer which is formed. In general, polymerisation temperatures in the range 30°-80° C. are convenient.

Thus, in principle, the temperature at which the polymerisation is carried out will be determined first and foremost with reference to the Tg value of the polymer which it is proposed to produce in dispersion, and, having decided upon that temperature, one will then proceed to choose an appropriate composition for the aqueous medium in which the process is to be conducted. In order to help the maintaining of a constant polymerisation temperature, it is preferred to arrange that the aqueous medium can boil under reflux at that temperature, and the nature and proportion of the water-miscible second constituent of the mixture will then be selected with this object in mind. Having regard to the fact that, for many of the monomers likely to be used in the process, an effective polymerisation temperature will lie in the range 70°-90° C., the second constituent of the aqueous medium, or a constituent thereof, will usually require to be a liquid of boiling point significantly lower than that of water.

In practice, there may be some interaction between these variables; for example, the freedom of choice of composition of the aqueous medium to suit a particular operating temperature may be restricted by the need to find a water-miscible second constituent which does not have a strong solvent action on the polymer which is formed, otherwise the aqueous medium as a whole may not be a non-solvent for the polymer and there may be a significant production of polymer in solution rather than in dispersion. In the case where the aqueous medium contains a relatively volatile water-miscible liquid, the available range of formulations may be increased by including therein a further water-soluble constituent which does not boil below the boiling temperature of water; such a further constituent may be either a solid or a liquid, capable of assisting the achievement of the necessary solvent/non-solvent characteristics in the aqueous medium. It will be desirable, however, to retain a sufficient proportion of the lower-boiling constituent to permit refluxing of the polymerisation mixture. Another factor to be borne in mind is the desirability or otherwise of the continuous phase of the final dispersion permanently containing materials other than water only. Where the water-miscible liquid constituent of the aqueous medium is sufficiently volatile to permit refluxing at the polymerisation temperature, that constituent can usually, if desired, be stripped off by distillation when polymerisation is complete. In contrast, a water-miscible constituent of higher boiling point may not be removable from the continuous phase in this way.

The use of the term "aqueous medium" herein does not imply that water should always be the major constituent of the medium in which the polymerisation is carried out; in many cases, the water-miscible constituent or constituents may predominate in the mixture. In practice, as high a proportion of water as possible is employed, consistent with the aqueous medium being capable of dissolving the monomer being polymerised at least to the extent necessary to avoid the existence of a separate monomer phase, and at the same time being a non-solvent for the polymer produced. Evidently the degree of solvency for the monomer which the aqueous medium is required to possess will depend upon the concentration of free monomer in the polymerisation mixture which it is desired to maintain during the process, which in turn will depend upon the rate at which it is desired that the polymerisation should proceed. In practice, water will most usually constitute 30-70% by weight of the aqueous medium.

Substances which are suitable for use as the water-miscible constituent of the aqueous medium include in particular the lower aliphatic alcohols; the preferred member of this class is methanol, but ethanol is also very suitable. Water-methanol mixtures can be prepared having boiling points which lie both in the optimum polymerisation temperature range and sufficiently above the polymer glass transition temperatures for the process of the invention to be carried out satisfactorily in such mixtures with a variety of acrylic or vinyl monomers. Ethanol is somewhat less preferred than methanol because its greater effectiveness as a chain terminator in the polymerisation process may make it difficult to obtain a disperse polymer of high molecular weight, and also because it is a more active solvent for many polymers than is methanol. Nevertheless, ethanol is useful where the monomer mixture to be polymerised contains an appreciable proportion of styrene. In the case of polymers derived from acrylic or methacrylic esters of higher alcohols, e.g. lauryl methacrylate, a suitable water-miscible constituent is acetonitrile.

Suitable water-miscible substances having a boiling point above that of water include, for example, butanol, 2-methoxyethanol, 2-ethoxyethanol, ethylene glycol, diethylene glycol and tetraethylene glycol. In general, the proportion of such substances which it is possible to use in the aqueous medium will be relatively low because they tend to be effective solvents for many polymers.

Although simple experimentation may sometimes be called for, the formulation of a suitable aqueous medium which meets the various requirements set out above does not present any serious difficulty in the majority of cases, especially if the Tg of the polymer to be formed does not exceed 60° C.

Steric stabilisation of the polymer particles produced in step (1) of the process is achieved by the presence in the polymerisation mixture of the block or graft copolymer. This copolymer contains in the molecule one type of polymeric component which is solvatable by the aqueous medium and the chains of which consequently adopt an extended configuration in that medium so as to form a steric barrier around the particles. The copolymer also contains another type of polymeric component which is not solvatable by the aqueous medium and is capable of becoming associated with the polymer particles formed. This copolymer may be introduced into the polymerisation mixture in various ways. Firstly, it may be introduced as a fully pre-formed starting material, prepared in a separate operation. Secondly, it may be formed in situ during the polymerisation step (1) by introducing into the polymerisation mixture, before polymerisation begins, a "precursor" compound comprising in its molecule a polymeric component which is solvatable by the aqueous medium and an unsaturated grouping which is capable of copolymerising with the monomer or monomers being polymerised. Thirdly, it may be formed, again in situ, by introducing into the polymerisation mixture before polymerisation begins a simple polymer of molecular weight at least 1000 which is soluble in the aqueous medium and which contains in the molecule hydrogen atoms which are abstractable by free radicals under the conditions of polymerisation, the polymer thereby becoming susceptible to grafting by some of the monomers being polymerised.

The use of a pre-formed block or graft copolymer as stabiliser in an aqueous dispersion polymerisation process is described in detail in British Patent Application No. 7924873. The solvatable polymeric component of the copolymer is derived from a water-soluble polymer, examples of which include nonionic polymers such as the polyethylene glycols and their monoalkyl ethers, poly(ethylene oxide)—poly (propylene oxide) copolymers containing at least 40% of ethylene oxide and their monoalkyl ethers, polyvinylpyrrolidone, polyacrylamide, polymethacrylamide and polyvinyl alcohol. Preferably the molecular weight of this component is at least 1000 and more preferably at least 2000. The preferred solvatable components are those derived from polyethylene glycols, or their monoalkyl ethers, of molecular weight in the range 2000–4000.

The second constituent of the block or graft copolymer, which is capable of associating with the disperse microparticles, can in the simplest case be of identical or similar chemical composition to the disperse polymer itself, which by definition is insoluble in (and therefore not solvated by) the aqueous medium. Such a polymeric component will have an inherent tendency to associate with the disperse polymer. However, any polymer which satisfies the more general requirement of non-solvatability by the aqueous medium is suitable as the second component. Examples of second polymeric components include polymers and copolymers derived from methyl methacrylate, ethyl acrylate, butyl acrylate, styrene, tert-butylstyrene, vinyl toluene, vinyl acetate and acrylonitrile; There may also be incorporated together with one or more of these monomers a functional monomer such as acrylic acid, methacrylic acid, 2-hydroxyethyl methacrylate and 2-hydroxyisopropyl methacrylate.

The pre-formed block or graft copolymer may range in structure from simple block copolymers of the AB, ABA or BAB types, where A and B represent the solvatable and non-solvatable components respectively, through multiple block copolymers of the ABABAB . . . types, to "comb" type graft copolymers of the structure $A_nB$, in which a plurality of the solvatable A components are attached at intervals to a polymer backbone constituting the hydrophobic, associatable B component. Preferably the copolymer is of this last-mentioned "comb" type and has a slight weight excess of the solvatable components A over the non-solvatable components B, for example in a ratio of from 1.1:1 to 2:1. It is also preferred that, in this type of copolymer, the value of n, i.e. the number of A components which are attached to each B component, should be in the range 3–10.

The molecular weight of each solvatable A component is, as already stated, at least 1000 and preferably at least 2000, the molecular weight of each non-solvated B component is preferably at least 1000. Moreover, it is preferred that the total molecular weight of the copolymer should be at least 5000.

The block or graft copolymer may be made by any of the methods which are well known in the art. Thus the solvatable component may be prepared first and then copolymerised with the appropriate monomers so as to build up the non-solvatable, associating component, or the non-solvatable component may be prepared first and the solvatable component then produced in situ. Alternatively, the individual components can both be prepared separately and then be covalently linked to one another through the medium of suitable mutually reactive groups. Thus, for example, in the preparation of the preferred "comb" type graft copolymers, a water-soluble polymer suitable as the A component, such as the mono-methyl ether of a polyethylene glycol of molecular weight at least 2000, can be converted to the acrylic or methacrylic ester, and this intermediate product can then be subjected to free radical-initiated copolymerisation with other unsaturated monomers such as styrene, ethyl acrylate, or methyl methacrylate, in order to build up an appropriate non-solvatable polymer backbone constituting the B component from which are pendant a plurality of the A component side chains. Another suitable type of addition copolymer may be made by means of ionic polymerisation methods, for example by preparing a "living" polystyrene block and then reacting this with ethylene oxide in order to build up a poly(oxyethylene) block attached thereto.

If desired, the non-solvatable component of the block or graft copolymer employed as stabiliser may contain groupings which are capable of reacting with the monomer or monomers which are being polymerised in the process of the invention. By this means, the stabiliser becomes covalently linked to the disperse polymer and the stability of the latter towards flocculation may be enhanced. Suitable reactive groupings include ethylenically unsaturated groupings which can copolymerise with the monomer, or functional groups which can react under the conditions of polymerisation with complementary functional groups in the monomer, e.g. epoxide groups which can react with a hydroxylic monomer such as 2-hydroxyethyl methacrylate. Methods of introducing such reactive groupings into the copolymer molecule will be apparent to those skilled in the art; for example, in the preparation of a "comb" type graft copolymer as outlined above, the unsaturated monomers with which the intermediate acrylic or methacrylic ester of polyethylene glycol is copolymerised may include an epoxide group-containing monomer, such as glycidyl acrylate or glycidyl methacrylate. In this way, the non-solvatable polymer backbone of the copolymer which is built up will be caused to contain pendant glycidyl groups. The latter may be utilised directly to react with a main monomer containing a functional group, such as a hydroxyl group, during the polymerisation process of the invention. Alternatively, the graft copolymer containing the glycidyl groups may be reacted further with an ethylenically unsaturated acid, such as acrylic acid or methacrylic acid, whereby there are introduced into the non-solvatable component of the copolymer double bonds which can copolymerise with the main monomer or monomers during the polymerisation process.

Where the block or graft copolymer stabiliser is formed in situ during the polymerisation step (1) of the process, according to the second mode of operation outlined above, and as described in more detail in British Patent Application No. 47585/78, the solvatable component of the "precursor" compound will, as in the case of the pre-formed copolymer, be derived from a water-soluble polymer. Examples of water-soluble polymers suitable or preferred for this purpose are those which have been referred to above in connection with the use of pre-formed copolymer. The precursor which is introduced into the polymerisation mixture is a derivative of such a water-soluble polymer containing a copolymerisable unsaturated grouping, which in the case of the polyethylene glycols, or their ethers, may conveniently be an ester of one of these substances with a copolymerisable unsaturated acid, for example methacrylic acid, itaconic acid or maleic acid. Esterification of the glycol, or ether thereof, may be effected by an ester-interchange reaction with a lower alkyl ester of the unsaturated acid, for example with methyl methacrylate; alternatively the glycol or its ether may be reacted with a suitable acid chloride, for example methacrylyl chloride, in the presence of a hydrogen chloride acceptor. Yet again, the glycol or its ether may be reacted directly with the unsaturated acid to give the ester, or with its anhydride to form a half-ester. Other suitable precursors may be obtained by reacting a carboxyl group-terminated polyvinylpyrrolidone (see, British Specification No. 1,096,912) with glycidyl methacrylate. Yet other suitable precursors may be obtained by the procedure described in co-pending British Patent Application No. 47584/78, that is to say by reacting a water-soluble polyalkylene glycol or its monoalkyl ether with a cyclic aliphatic carboxylic anhydride and then reacting the resulting half-ester with an epoxy compound containing a polymerisable double bond. For example, the monoethyl ether of a polyethylene glycol is reacted with succinic anhydride and the product then condensed with glycidyl methacrylate to give a precursor containing a terminal vinyl grouping. As explained in the co-pending Application referred to, this method of making a precursor is convenient in particular because it avoids the necessity of removing any by-products or excess reagents, which could interfere with the subsequent use of the precursor, that arises with most of the other methods discussed above.

Where the block or graft copolymer stabiliser is formed in situ according to the third mode of operation outlined above, as described in detail in British Patent Application No. 7921091, the simple polymer which is introduced into the polymerisation mixture is a water-soluble polymer of molecular weight at least 1000 which may be either linear or branched and either homopolymeric or copolymeric in nature, such that all polymeric components of the molecule are soluble in the aqueous medium (in this respect it is distinguished, when a copolymer, from the pre-formed block or graft copolymers used according to the first mode of operation, where by definition certain polymeric components of the molecule are not per se soluble in the aqueous medium). Furthermore, the simple polymer does not contain any deliberately introduced double bonds which can copolymerise with the monomer or monomers being polymerised (it is thus distinguished from the copolymerisable "precursors" previously discussed). The simple polymer is required, as stated, to contain hydrogen atoms which are abstractable by free radicals under the conditions of polymerisation. This requirement is in practice met by all polymers which are water-soluble, and accordingly suitable polymers include those which have been referred to above in connection with the solvatable components of pre-formed copolymer stabilisers. However, it may be an advantage if the polymer molecule contains deliberately introduced groups which are especially susceptible to abstraction of hydrogen by a neighbouring free radical. Such groups include mercapto, sec-butyl, cyanomethyl and $(CH_3)_2$ $NCH_2$—groups, and examples of suitable water-soluble polymers containing them include copolymers of vinylpyrrolidone with minor proportions of dimethylaminoethyl methacrylate, sec-butyl methacrylate or vinyl cyanoacetate.

The proportion of the block or graft copolymer stabiliser which is required to be present during the polymerisation process of step (1) will vary to some extent according to the particular disperse polymer which is concerned and the particle size which it is desired that the resulting dispersion should have. The optimum proportion in any individual case can readily be found by simple experiment, whether the copolymer be pre-formed and added as such or formed in situ from either a copolymerisable precursor or a water-soluble simple polymer. Whichever of these three modes of operation is adopted, however, it may be stated for general guidance that the proportion of material added (i.e. pre-formed copolymer, precursor or water-soluble polymer) will usually lie in the range 0.5–20%, and more especially 2–10%, by weight of the disperse polymer content of the dispersion being made.

Step (1) of the process of the invention will usually require the presence in the polymerisation mixture of a suitable catalyst or initiator capable of producing free radicals. Suitable substances for this purpose are those catalysts or initiators well known for use in the polymerisation of acrylic or vinyl monomers which are soluble in the monomers, in particular azo compounds such as azodiisobutyronitrile and 4,4-azobis(4-cyanovaleric acid), or peroxy compounds such as benzoyl peroxide, lauroyl peroxide and diisopropyldicarbonate. To some extent, the choice of initiator can influence the temperature at which the polymerisation is carried out and thus may constitute a further factor to be considered in deciding the overall composition of the polymerisation mixture as discussed above. Furthermore, the type of initiator used may vary according to the manner in which the block or graft copolymer stabiliser is to be introduced into the polymerisation mixture. Where the copolymer is pre-formed and is introduced as such, azo compounds are generally to be preferred because of their reduced tendency, as compared with peroxy compounds, to promote random grafting of the monomers being polymerised on to the block or graft copolymer; such grafting could lead to decreased efficiency of the copolymer as a steric stabiliser for the disperse polymer formed. The same preference applies in the case of in situ production of the copolymer via a copolymerisable precursor, since here the deliberately introduced unsaturated grouping in the precursor is designed to be the exclusive grafting point and additional, random, grafting could again lead to difficulties. In contrast, where the copolymer is to be produced in situ by hydrogen abstraction grafting on to a water-soluble simple polymer, the preference is for peroxy compounds as initiators because of their known ability to promote grafting by this mechanism.

Whichever type of catalyst or initiator is used, the amount required will normally lie in the range 0.1–2.0%, preferably 0.5%–2%, of the weight of monomer, and the addition of this ingredient is preferably made along with the monomers being polymerised.

There may also be present during the polymerisation process, where necessary, a chain transfer agent which, unlike the catalyst or initiator, is insoluble in the aqueous medium. Examples of suitable agents are n-octyl-mercaptan and tert-dodecyl mercaptan. The chain transfer agent may be used in an amount of from 0.1–2% of the weight of monomer. The effect of the chain transfer agent is to regulate the molecular weight of the disperse polymer and ultimately to reduce the proportion of finer particles in the disperse phase, thus increasing the average particle size. Such measures to regulate molecular weight are not, however, usually employed as the water-miscible constituent of the aqueous medium. In particular, it is preferred not to use an additional chain transfer agent in the case of the in situ production of the copolymer stabiliser by hydrogen abstraction grafting on to a water-soluble simple polymer.

In carrying out step (1) of the process of the invention, it is preferred to introduce the monomer or monomers gradually into the aqueous medium, rather than to add the total monomer charge all at once. This procedure may in fact be essential in many cases if the condition is to be satisfied that at no time during the polymerisation should there be present a separate monomer phase. Where two or more monomers are involved, these may be pre-mixed before being fed into the aqueous medium. A particularly preferred procedure, whereby improved control of particle size of the disperse polymer is achieved, is to add initially to the aqueous medium a small portion of the total monomer charge, together with an appropriate amount of initiator. This initial charge, which may be added all at once provided that the aqueous medium is capable of dissolving it completely, is allowed to polymerise first; the reaction mixture is initially clear and homogeneous, but subsequently becomes opalescent as a very fine "seed" dispersion of polymer is formed. Following this, the main portion of the monomer charge, containing initiator, is fed in steadily at a rate sufficient to maintain an acceptable speed of polymerisation but not such as to cause monomer to form a separate phase in the polymerising mixture. Where the polymerisation is carried out at the reflux temperature of the aqueous medium it is preferred to arrange for this main monomer feed to mix with the returning distillate so that it is well diluted before it enters the reaction zone; this distillate will normally be rich in the second, water-miscible constituent of the aqueous medium and will be a good solvent for the monomer being introduced. The rate of monomer feed is preferably such that the monomer is diluted with at least its own volume of returning distillate.

The manner of introduction of the preformed copolymer stabiliser, the copolymerisable precursor or the graftable single polymer, as the case may be, into the polymerisation mixture may vary somewhat according to circumstances. In every case, some portion of the ingredient in question is added prior to the commencement of polymerisation; thus, where a preliminary "seed" stage is operated, at least part of the total charge of either a pre-formed copolymer or a precursor is added along with the initial charge of monomer and the remainder of the copolymer or precursor is then introduced in the subsequent feed of the main part of the monomer charge. If the seed stage procedure is used in the case of a simple polymer which is to undergo grafting, the whole of the requisite amount of that material should be introduced with the initial monomer charge.

Where step (1) of the process is carried out using a simple polymer graftable by hydrogen abstraction it may assist in achieving a high degree of grafting of this material if it is pre-activated before it is introduced into the polymerisation mixture. This may be done by heating it, preferably dissolved in some of the aqueous medium to be used subsequently, together with the polymerisation initiator at a temperature in the range 65° to 120° C. for a period of from 5 minutes to 1 hour; the conditions chosen should, of course, be such as not to cause the soluble polymer to undergo degradation, cross-linking or other deleterious changes.

In the case where the process of the invention is performed, as described above, by gradual "feed" of monomer to a preformed "seed" dispersion of polymer, it is possible to form the "seed" particles from monomer different from that which is subsequently introduced in the "feed" stage. Such "seed" monomer does not need to satisfy the requirement hereinbefore stated that the polymerisation temperature should be at least 10° C. higher than the glass transition temperature of the polymer (viz. the "seed" polymer) which is formed. Thus, essentially any monomer may be used in the "seed" stage so long as it does not form a separate phase in the reaction mixture and so long as it gives rise to a polymer which is insoluble in the aqueous medium. For example, where the main disperse polymer is to be derived from a mixture of methyl methacrylate and 2-ethylhexyl acrylate (Tg of polymer, approximately −10° C.; polymerisation temperature, 76–80° C.), it is possible to employ methyl methacrylate alone (Tg of polymer, 105° C.) in a "seed" stage; the main monomers are then introduced in the "feed" stage to give rise to the main disperse polymer. It is, however, to be understood that, in a "seed-feed" procedure as just described, the "feed" stage must always be conducted in accordance with the definition of the process of the invention hereinabove given.

Other substances which may be added to the polymerisation mixture in step (1) include, as already mentioned, a plasticiser for the disperse polymer, where it is desired that the latter should be softer than the unmodified polymer. The addition of plasticiser may, indeed, render it possible to apply this step of the process of the invention to certain monomers where it would otherwise fail. For example, the homopolymer of methyl methacrylate has a Tg of 105° C. and it is practically impossible to operate the present process with methyl methacrylate as the sole monomer so as to produce a stable latex; however, by the addition of plasticiser the Tg can be brought down to a level where the process can successfully be carried out. Suitable plasticisers are any of those which are well known in the art for use with the particular polymer in question; they may be either soluble or insoluble in the aqueous medium. Conveniently the plasticiser may be added to the polymerisation mixture along with the monomer or monomers.

The product of step (1) of the process of the invention is an aqueous dispersion of microparticle cores, which may have disperse phase contents in the range 40–60% by weight and even as high as 70% by weight. The particles are sterically stabilised against gross flocculation. In step (2) of the process, further ethylenically unsaturated monomer is polymerised in the presence of this dispersion, so as to give rise to the non-crosslinked polymer with which the particle core is associated. Suitable ethylenically unsaturated monomers for use in this step include those referred to in connection with step (1), except that in step (2) no monomers are employed which are polyfunctional with respect to the polymerisation reaction. The further polymerisation is carried out most conveniently by following up step (1), once the conversion of monomer and crosslinking reaction in that step are complete, with the direct feeding into the dispersion of core particles thus obtained of the further monomer, if desired with the addition of further block or graft copolymer stabiliser or of further copolymerisable precursor or soluble polymer, as appropriate, in order to maintain dispersion stability of the particles during this procedure. Whilst it is necessary, as already stated, that during step (2) the formation of a separate free monomer phase is avoided, it is not necessary that the temperature at which the further monomer is polymerised should be at least 10° higher than the Tg of the non-crosslinked polymer which is produced, but it is preferred that the further monomer does not amount to more than 50% of the total weight of monomer used in steps (1) and (2) combined.

As already stated, the non-crosslinked polymer must be per se soluble in the non-aqueous medium, and the monomer or monomers from which it is to be formed in step (2) will be chosen accordingly, following principles well understood by those skilled in the art. However, because of this inherent solubility in the non-aqueous medium it is necessary to ensure that the non-crosslinked polymer is firmly attached to the cores of the microparticles; otherwise, on carrying out step (3) of the process, the non-crosslinked polymer may be dissolved right away from the microparticles and the latter would lose their stability. The required bonding is achieved through grafting of the non-crosslinked polymer on to the microparticle core; this grafting may take place through copolymerisation of residual unsaturated groupings in the core polymer, originating from the crosslinking monomer used in step (1), with the monomer from which the non-crosslinked polymer is derived; some proportion of that crosslinking monomer, sufficient for this purpose, always remains incompletely polymerised or reacted in the core polymer. Alternatively grafting may occur through the medium of abstraction of hydrogen atoms from the core polymer by free radicals present in the polymerisation mixture, giving active centres on to which the non-crosslinked polymer chains may grow.

Although the monomers used in forming the non-crosslinked polymer are by definition such that no crosslinking takes place during the formation of that polymer, nevertheless one or more of them may carry, in addition to the polymerisable group, a chemically functional group whereby the non-crosslinked polymer is rendered crosslinkable by an external crosslinking agent and can be thus crosslinked after the application to a substrate of a coating composition into which the microparticles are incorporated. Thus, for example, the monomers may include one carrying a hydroxyl group or a carboxyl group, which can subsequently be reacted with a melamine-formaldehyde resin.

In carrying out step (2) of the process, there may be introduced, along with the monomer from which the non-crosslinked polymer is to be derived, further catalyst or initiator for the polymerisation. In the event that it is desired to promote the grafting on of the non-crosslinked polymer to the core polymer by the hydrogen abstraction mechanism mentioned above, the use of a peroxide catalyst may be beneficial here.

The composite polymer microparticles which result from step (2) of the process are usually spherical and have diameters in the range 0.01 to 10 microns, more especially in the range 0.1 to 1 micron.

In the final step of the process, the polymer microparticles, associated with the non-crosslinked polymer, which are obtained in dispersion in the aqueous medium on completion of step (2), are transferred to the chosen non-aqueous medium. This is accomplished by blending the aqueous dispersion with the non-aqueous medium and then removing the water and the water-miscible second constituent of the aqueous medium by distillation. A particularly convenient procedure is available in the case where the nonaqueous medium forms an azeotrope with water and with the second constituent, namely to add the aqueous dispersion from step (2) gradually to the non-aqueous medium maintained at its boiling point, so that the water and second constituent are rapidly removed as an azeotropic distillate. There is thus finally obtained a stable dispersion of the microparticles in the non-aqueous liquid alone, the solids concentration of which can then be adjusted as desired either by evaporation or by addition of further liquid. Where the non-aqueous liquid does not form an azeotrope with either the water or the second constituent, the latter materials can be removed by straightforward distillation provided that the non-aqueous liquid has a boiling point higher than that of either of them. If desired, the distillation may be carried out under sub-atmospheric pressure.

The non-aqueous liquid must, as already stated, be a solvent for the non-crosslinked polymer. It may be either miscible or immiscible with water. It may be of various types, according to the nature of the non-crosslinked polymer, and may be either a single liquid or a mixture. Of particular interest are hydrocarbon liquids, both aliphatic and aromatic, such as aliphatic petroleum fractions boiling at temperatures within the range 80° to 260° C., cyclohexane, toluene and xylene. Other suitable non-aqueous liquids include butanol, 2-ethoxyethanol, methyl ethyl ketone and methyl isobutyl ketone.

The non-aqueous dispersions of composite polymer microparticles obtained by the foregoing procedure may be incorporated directly into a coating composition, the main film-forming constituent of which is compatible with the non-crosslinked polymer component of the microparticles. This condition will usually be satisfied if the composition in question is a solution of the film-forming material in the same non-aqueous liquid as that of the microparticle dispersion, or in a liquid of similar polar character. Alternatively, the composite microparticles may first be isolated from the dispersion, for example by spray drying, and then be incorporated into a liquid coating composition as a dry powder. As a further alternative, the dry microparticles thus isolated may be blended into a powder coating composition.

According to the nature of the polymer microparticles, as already indicated, their presence in the coating composition may either modify the rheological properties of the composition so as to secure improvements in the application characteristics of the latter, e.g. a reduced tendency for "sagging" of the film to occur on the substrate immediately following application; or it may modify the ultimate properties of the coating film, as for example by rendering it less brittle.

The invention is illustrated but not limited by the following Examples in which parts are by weight:

EXAMPLE 1

(1) Preparation of sterically stabilised latex of crosslinked core particles

A reaction flask was fitted with thermometer, stirrer, provision for blanketing the contents with nitrogen and an up-and-over condenser system reconnected to the flask via a mixing chamber. The flask was heated in a water-bath. Monomer to be polymerised was fed by means of a pump at a controlled rate into the mixing chamber where, under operating conditions, it became diluted with returning distillate before entering the flask.

The following charges were prepared:

| (A) | Distilled water | 22.3 parts |
|---|---|---|
|  | Methanol | 35.25 parts |
|  | Methacrylic acid ester of methoxypolyethylene glycol, mol. wt. 1900 | 1.3 part |
| (B) | Butyl acrylate | 2.9 parts |
|  | Styrene | 0.6 part |
|  | Azodiisobutyronitrile | 0.1 part |
| (C) | Allyl methacrylate | 0.6 part |
|  | Methacrylic acid ester of methoxypolyethylene glycol, mol. wt. 1900 | 1.0 part |
|  | Butyl acrylate | 20.9 parts |
|  | Styrene | 4.8 parts |
|  | Azodiisobutyronitrile | 0.4 part |

Charge A was introduced into the flask, Charge B was added thereto and the mixture heated to reflux temperature (about 74° C.). After 1 hour a fine bluish-white dispersion of seed polymer particles had formed, and Charge C was then fed in via the pump over a period of 3 hours. When the addition was complete, refluxing was continued for a further 1 hour to ensure complete conversion of monomers and crosslinking of the core polymer.

(2) Modification of core particles with non-crosslinked polymer

To the dispersion of core polymer obtained from step (1), there was then fed in via the pump, at the same temperature as before, the following charge:

| (D) | Methyl methacrylate | 9.7 parts |
|---|---|---|
|  | Azodiisobutyronitrile | 0.1 part |

This charge was added over a period of 1 hour and the polymerisation mixture was then held at reflux temperature for a further 1 hour with the final addition of 0.05 part more of azodiisobutyronitrile. The mixture was thereafter allowed to cool, with stirring, to room temperature. There was obtained a stable dispersion of composite microparticles of substantially submicron size, of which the core polymer had the composition butyl acrylate 79.9%, styrene 18.1%, allyl methacrylate 2.0%, and a theoretical Tg of $-26°$ C. The gel content of the microparticles was measured by treating the particles with tetrahydrofuran, then centrifuging off, drying and weighing the residual gel. A gel content of 69.5% was found. The overall composition of the microparticles was butyl acrylate 60.25%, styrene 13.75%, methyl methacrylate 24.5%, allyl methacrylate 1.5%. The molecular weight of the non-crosslinked polymer was estimated by gel permeation chromatography to be 53,000.

(3) Transfer of microparticles to non-aqueous medium

The microparticle latex obtained from step (2) (135 g) was added slowly to refluxing toluene (300 g) in a 700-ml flask fitted with stirrer, thermometer, dropping funnel and Dean and Stark separator. The water and methanol were removed from the system as azeotropes along with some of the toluene as the distillate temperature generally climbed back to 110° C. The flask then contained a clear dispersion of the microparticles in toluene; this had a solids content of 16.1% and a viscosity of approximately 4 poises.

EXAMPLE 2

This Example illustrates the transfer of composite polymer microparticles, prepared as described in Example 1(1) and (2), into a different non-aqueous medium.

The aqueous microparticle latex resulting from the procedure of steps (1) and (2) of Example 1 (1660 g) was added over a period of about 4 hours to refluxing methyl isobutyl ketone (3500 g) contained in a 10-litre flask fitted as described in step (3) of Example 1. When the addition was complete, there was begun the gradual addition of further methyl isobutyl ketone (4500 g). During these additions, which occupied a total period of 2 hours, a distillate mixture of methanol, water and methyl isobutyl ketone (total amount, 2788 g) was removed. The residue in the flask was a creamy coloured dispersion of the composite microparticles in methyl isobutyl ketone, having a solids content of 11% and a viscosity of 0.5 poise. In contrast to the product of stage (3) of Example 1, this dispersion was not clear because of the difference of refractive index between the gel polymer and the methyl isobutyl ketone.

EXAMPLE 3

A latex of modified acrylic polymer microparticles was prepared according to the method described in Example 1(1) and (2), but the monomer composition of the core polymer was as follows: butyl acrylate 39%, styrene 10%, 2-ethylhexylacrylate 25%, acrylonitrile 24.5%, allyl methacrylate 1.5%. The non-crosslinked polymer was homopolymer methyl methacrylate and the weight ratio of core polymer to non-crosslinked polymer was 75:25. The core polymer had a refractive index of 1.49 and a theoretical Tg of approximately −31° C. The latex finally obtained had a solids content of 35% and the particle size was about 0.5 micron.

The modified microparticles were then transferred from the aqueous latex to toluene, following the method described in Example 1(3), using 150 g of latex and 500 g of toluene. In total, 285 g of distillate was removed. The resulting dispersion of the microparticles in toluene had a solids content of 15.1% and a viscosity of approximately 0.3 poise.

EXAMPLE 4

A latex of modified acrylic polymer microparticles was prepared according to the method of Example 1(1) and (2), with the same core polymer composition as that described in Example 1 but with a non-crosslinked polymer derived from 2-ethylhexyl acrylate. The latex obtained had a solids content of 35%.

The modified microparticles were then transferred from the aqueous latex to white spirit, following the method of Example 1(3), using 150 g of latex and 500 g of white spirit (boiling range 160°–200° C.). Approximately 150 g of distillate was removed, to provide a dispersion of the microparticles in the white spirit of solids content 11.5%.

EXAMPLE 5

The procedure of Example 1(1) and (2) was repeated, except that the allyl methacrylate was replaced by an equal weight of ethylene glycol dimethacrylate. The resulting modified latex, after filtration to remove some coarse material, had a particle size of 0.57 micron and a solids content of 34.7%.

The modified latex (100 parts) was then transferred to toluene (302 parts) as described in Example 1(3), methanol and water being removed until a distillation temperature of 110° C. was attained. The resulting dispersion of microparticles in toluene had a viscosity of 0.9 poise and solids content of 18.6%.

EXAMPLE 6

The procedure of Example 1(1) and (2) was repeated, but replacing the methacrylic acid ester of methoxypolyethylene glycol of mol.wt 1900 by an equal weight of the methacrylic acid ester of methoxypolyethylene glycol of mol.wt. 4500. The modified latex obtained had a particle size of 0.67 micron and a solids content of 37%.

The modified latex (100 parts) was then diluted with methanol (50 parts) and transferred to toluene (350 parts) as described in Example 1(3). Methanol, water and toluene azeotrope were removed until the distillation temperature was 110° C. The resulting dispersion of microparticles in toluene had a viscosity of 1.2 poise and a solids content of 12.4%.

We claim:

1. A process for the production of a stable dispersion in a non-aqueous liquid medium of composite polymer microparticles having a diameter of from 0.1 to 10 microns, each of which comprises a core of crosslinked polymer surrounded by and grafted to a layer of non-crosslinked polymer, the process comprising the steps of (1) polymerising one or more ethylenically unsaturated monomers, including at least one crosslinking monomer, from which the crosslinked core polymer of the microparticles is to be derived, in an aqueous medium as hereinbefore defined at a temperature at least 10° C. higher than the glass transition temperature of the core polymer in the presence in the aqueous medium as steric stabiliser of a block or graft copolymer which contains in the molecule a polymeric component which is solvatable by the aqueous medium and another polymeric component which is not solvatable by the aqueous medium and is capable of becoming associated with the polymer particles formed, the concentration of free monomer in the polymerisation mixture being maintained throughout this process step at a level such that at no time does the free monomer form a separate phase and the total amount of monomer polymerised being such that the resulting dispersion contains at least 20% by weight of microparticles, (2) polymerising, in the dispersion obtained from step (1), one or more further ethylenically unsaturated monomers, not including any crosslinking monomer, from which the non-crosslinked polymer of the outer layer is to be derived, optionally in the presence of additional block or graft copolymer stabiliser, the concentration of such further monomer in the free state in the polymerisation mixture being maintained at a level such that at no time does that free monomer form a separate phase, and (3) transferring the polymer microparticles from the resulting dispersion into a non-aqueous liquid medium which is a solvent for the non-crosslinkable polymer under such conditions that the particles become stably dispersed therein.

2. A process as claimed in claim 1, wherein the ethylenically unsaturated monomer is selected from acrylic acid, methacrylic acid and the alkyl esters thereof.

3. A process as claimed in claim 1 or claim 2, wherein the crosslinking monomer is a monomer which is polyfunctional with respect to the polymerisation reaction.

4. A process as claimed in any one of claims 1 to 3, wherein the temperature of polymerisation is at least 30° C. higher than the polymerisation glass transition temperature.

5. A process as claimed in any one of claims 1 to 4, wherein the water-miscible constituent of the aqueous medium is methanol or ethanol.

6. A process as claimed in any one of claims 1 to 5, wherein the block or graft copolymer stabiliser is produced in situ during the polymerisation step (1) by introducing into the polymerisation mixture, before polymerisation begins, a precursor compound comprising in its molecule a polymeric component which is solvatable by the aqueous medium and an unsaturated grouping which is capable of copolymerising with the monomer or monomers.

7. A process as claimed in claim 6, wherein the solvatable polymeric component of the precursor compound is derived from a polyethylene glycol, or a monoalkyl ether thereof, having a molecular weight in the range 2000–4000.

8. A process as claimed in any one of claims 1 to 7, wherein the amount of further monomer polymerised in step (2) is at most 50% of the total weight of monomer used in steps (1) and (2) combined.

9. A process as claimed in any one of claims 1 to 8, wherein one or more of the further monomers polymerised in step (2) carries, in addition to the polymerisable group, a chemically functional group whereby the non-crosslinked polymer in the microparticles may become crosslinked by means of an external crosslinking agent after application of the composition to a substrate.

10. A process as claimed in any one of claims 1 to 9, wherein step (3) is accomplished by blending the aqueous dispersion obtained from step (2) with the non-aqueous medium and then removing the water and the water-miscible second constituent of the aqueous medium by distillation as an azeotropic mixture.

* * * * *